US008774090B2

(12) United States Patent
Giaretta et al.

(10) Patent No.: US 8,774,090 B2
(45) Date of Patent: Jul. 8, 2014

(54) METHOD AND APPARATUS FOR DETACH HANDLING IN MULTIPLE ACCESS WIRELESS COMMUNICATIONS

(75) Inventors: Gerardo Giaretta, San Diego, CA (US); Patrick Stupar, Nuremberg (DE); Haipeng Jin, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 12/985,170

(22) Filed: Jan. 5, 2011

(65) Prior Publication Data

US 2012/0008551 A1 Jan. 12, 2012

Related U.S. Application Data

(60) Provisional application No. 61/293,539, filed on Jan. 8, 2010.

(51) Int. Cl.
*H04W 4/00* (2009.01)

(52) U.S. Cl.
USPC .......................................... 370/328

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | | |
|---|---|---|---|---|
| 8,270,369 B1 * | 9/2012 | Chang | | 370/331 |
| 2007/0258407 A1 * | 11/2007 | Li et al. | | 370/331 |
| 2009/0262736 A1 * | 10/2009 | Zhao et al. | | 370/389 |
| 2009/0303914 A1 * | 12/2009 | Gonsa et al. | | 370/312 |
| 2010/0040024 A1 * | 2/2010 | Wu | | 370/331 |
| 2010/0075659 A1 * | 3/2010 | Kim et al. | | 455/422.1 |
| 2010/0322128 A1 * | 12/2010 | Becker et al. | | 370/312 |
| 2010/0329244 A1 * | 12/2010 | Buckley et al. | | 370/352 |
| 2011/0075675 A1 * | 3/2011 | Koodli et al. | | 370/401 |

FOREIGN PATENT DOCUMENTS

| | | |
|---|---|---|
| EP | 1655985 A2 | 5/2006 |
| WO | WO-2009002844 A2 | 12/2008 |
| WO | WO2009136820 A1 | 11/2009 |

OTHER PUBLICATIONS

International Search Report and Written Opinion—PCT/US2011/020597, ISA/EPO—May 18, 2011.
Taiwan Search Report—TW100100851—TIPO—Jun. 26, 2013.
Ericsson, et al., Mobility between 3GPP and un-trusted non-3GPP access using S2c, 3GPP TSG SA WG2 Architecture—52#57, S2-072109,Apr. 27, 2007,URL,http://www.3gpp.org/ftp/tsg_sa/WG2_Arch/TSGS2_57_Beijing/Docs/S2-072109.zip.

* cited by examiner

*Primary Examiner* — Jung-Jen Liu
(74) *Attorney, Agent, or Firm* — François A. Pelaez

(57) ABSTRACT

Methods and apparatuses are provided that facilitate detaching one of a plurality of network connections to ensure state information is retained at one or more network nodes. For a device initiated detach, the device can transmit a handover message related to performing a handover of one network connection to another active network connection, as opposed to explicitly detaching the network connection. This can cause at least some state information, such as a gateway identifier, to be retained in one or more network nodes. For a network initiated detach, a gateway can provision state information to a state information server following receiving a routing tunnel termination message to ensure state information deleted as a part of the detach is re-provisioned to the state information server.

10 Claims, 13 Drawing Sheets

METHOD AND APPARATUS FOR DETACH HANDLING IN MULTIPLE ACCESS WIRELESS COMMUNICATIONS

CLAIM OF PRIORITY UNDER 35 U.S.C. §119

The present Application for Patent claims priority to Provisional Application No. 61/293,539 entitled "DETACH HANDLING FOR A MULTIPLE ACCESS SCENARIO" filed Jan. 8, 2010, and assigned to the assignee hereof and hereby expressly incorporated by reference herein.

BACKGROUND

Field

The following description relates generally to wireless network communications, and more particularly to utilizing multiple accesses to communicate with a wireless network.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, devices can communicate with a wireless network using multiple network connections to increase diversity, increase data rate, provide additional functionality, and/or the like. In one example, a device can communicate with the wireless network over an LTE connection and a wireless local area network (WLAN) connection. To facilitate seamless access, for example, devices can automatically attach and/or detach one or more connections based on one or more policies. For example, detaching a connection can include clearing state information from one or more network components related to the detaching. In some cases, such clearing of state information may cause different network components to have different state information regarding the device. In addition, a device can move flows of one connection to another before detaching the connection.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with properly handling detach of one or more connections in a multiple access scenario to ensure consistent states for a device among network components. In one example, one or more network components can ensure that a home subscriber server (HSS) maintains information regarding one or more gateways associated with a device when one or more connections are detached at the device. In this regard, for example, the device can again attach to the one or more connections and utilize a similar configuration.

According to an example, a method for detaching one of multiple connections to one or more wireless networks is provided that includes communicating over a plurality of network connections that each provide access to a gateway and determining to detach at least one of the plurality of network connections. The method further includes performing a handover of one or more flows related to the at least one of the plurality of network connections to a different one of the plurality of network connections and transmitting a handover message related to performing a handover of the at least one of the plurality of network connections to the different one of the plurality of network connections instead of detaching.

In another aspect, an apparatus for detaching one of multiple connections to one or more wireless networks is provided that includes at least one processor configured to communicate over a plurality of network connections that each provide access to a gateway and determine to detach at least one of the plurality of network connections. The at least one processor is further configured to perform a handover of one or more flows related to the at least one of the plurality of network connections to a different one of the plurality of network connections and transmit a handover message related to performing a handover of the at least one of the plurality of network connections to the different one of the plurality of network connections instead of detaching. In addition, the apparatus includes a memory coupled to the at least one processor.

In yet another aspect, an apparatus for detaching one of multiple connections to a wireless network is provided that includes means for communicating over a plurality of network connections that each provide access to a gateway and means for determining to detach at least one of the plurality of network connections. The apparatus further includes means for transmitting a handover message related to performing a handover of the at least one of the plurality of network connections to a different one of the plurality of network connections instead of detaching, wherein the means for communicating performs a handover of one or more flows related to the at least one of the plurality of network connections to the different one of the plurality of network connections.

Still, in another aspect, a computer-program product is provided for detaching one of multiple connections to one or more wireless networks including a computer-readable medium having code for causing at least one computer to communicate over a plurality of network connections that each provide access to a gateway and code for causing the at least one computer to determine to detach at least one of the plurality of network connections. The computer-readable medium further includes code for causing the at least one computer to perform a handover of one or more flows related to the at least one of the plurality of network connections to a different one of the plurality of network connections and code for causing the at least one computer to transmit a handover message related to performing a handover of the at least one of the plurality of network connections to the different one of the plurality of network connections instead of detaching.

Moreover, in an aspect, an apparatus for detaching one of multiple connections to a wireless network is provided that includes a network communicating component for communicating over a plurality of network connections that each provide access to a gateway and a detachment determining component for determining to detach at least one of the plurality of network connections. The apparatus further includes a handover message provisioning component for transmitting a handover message related to performing a handover of the at least one of the plurality of network connections to a different one of the plurality of network connections instead of detaching, wherein the network communicating component performs a handover of one or more flows related to the at least one of the plurality of network connections to the different one of the plurality of network connections.

According to another example, a method for provisioning deleted state information to a HSS is provided including receiving a routing tunnel termination message from a mobility management entity (MME) associated with a detach of one of a plurality of connections between a device and a network. The method further includes transmitting a gateway identifier to a HSS based at least in part on the receiving the routing tunnel termination message.

In another aspect, an apparatus for providing state information to a HSS is provided that includes at least one processor configured to receive a routing tunnel termination message from a MME and transmit a gateway identifier to a HSS based at least in part on the receiving the routing tunnel termination message. In addition, the apparatus includes a memory coupled to the at least one processor.

In yet another aspect, an apparatus for provisioning deleted state information to a HSS is provided that includes means for receiving a routing tunnel termination message from a MME. The apparatus further includes means for transmitting a gateway identifier to a HSS based at least in part on the receiving the routing tunnel termination message.

Still, in another aspect, a computer-program product is provided for provisioning deleted state information to a HSS including a computer-readable medium having code for causing at least one computer to receive a routing tunnel termination message from a MME. The computer-readable medium further includes code for causing the at least one computer to transmit a gateway identifier to a HSS based at least in part on the receiving the routing tunnel termination message.

Moreover, in an aspect, an apparatus for provisioning deleted state information to a HSS is provided that includes a detaching component for receiving a routing tunnel termination message from a MME. The apparatus further includes a state information provisioning component for transmitting a gateway identifier to a HSS based at least in part on the receiving the routing tunnel termination message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
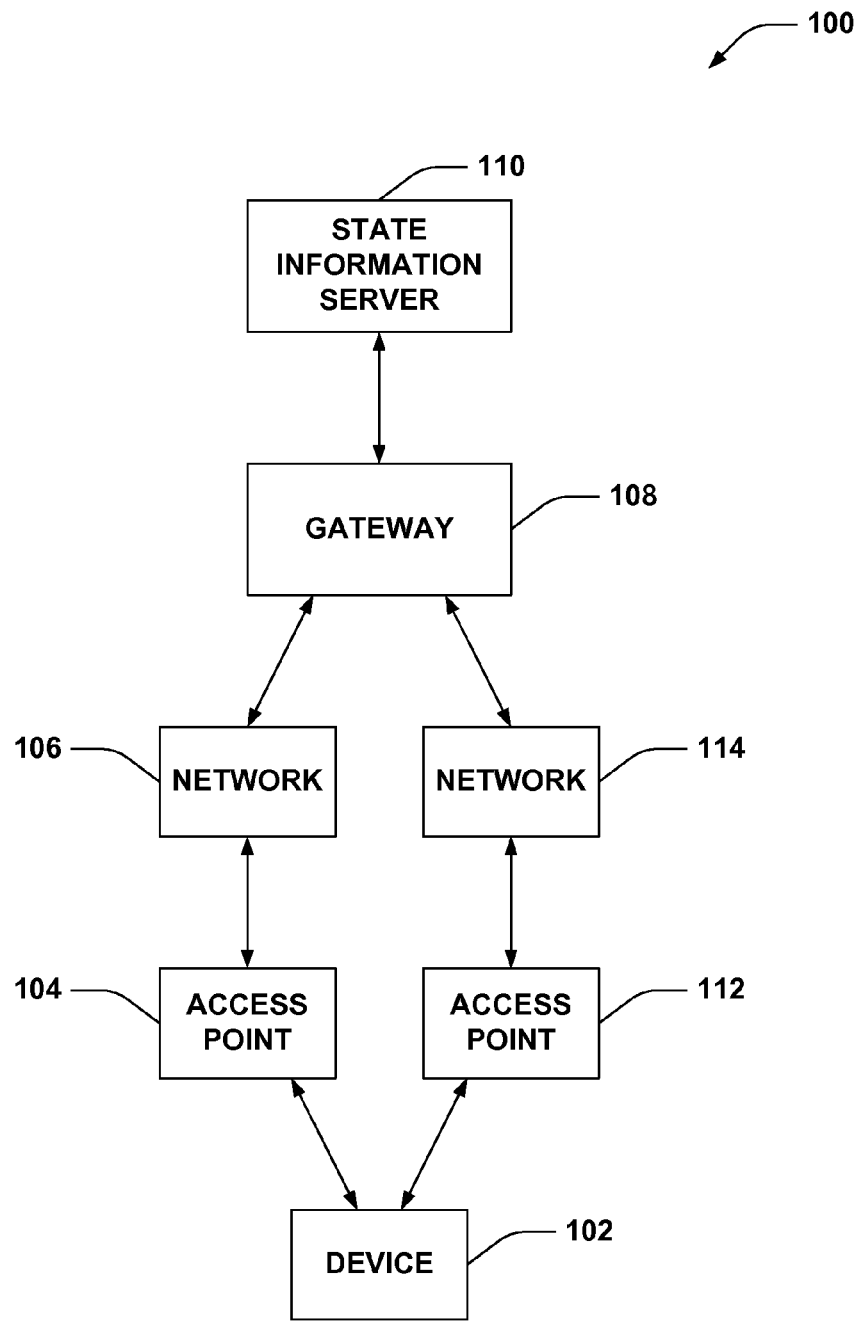
FIG. 1 illustrates an example system for communicating over a plurality of network connections.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, detaching of a connection in a multiple access scenario can be handled to ensure consistent state of a related device among network components. For example, detaching a connection at a device can cause removal or modification of certain state information for the device in one or more network components. In some cases, such as where the connection is one of multiple connections, removal or modification of state information caused by detaching the connection may not be desired. In a specific example, a device can reattach a detached connection to a network using previous state information. Where one or more network components previously deleted the state information, inconsistent states can result between the device and certain network components. As described herein, for example, in a device-initiated detach from a network, the device can transmit a handover message related to handing over a connection to a different active connection with a different network, which can cause components of the network to maintain state information for the device, ensuring consistent state information between the device and the network components. In a network-initiated detach, for example, one or more network components can forward device state information to other network components, which ensures consistent state information between the device and the network in case the device subsequently reattaches to the network.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates communicating over multiple network connections. System 100 includes a device 102 that can communicate with an access point 104 to receive access to a network 106. The network 106 can communicate with a gateway 108 to access a state information server 110 that stores information for device 102, which can include subscription information, state information when communicating in one or more networks, and/or the like, or one or more other network components. In addition, device 102 can communicate with access point 112 to access network 114, which can also access state information server 110. In this regard, for example, device 102 can simultaneously communicate with networks 106 and 114 for increased diversity, increased data rate, additional functionality, and/or the like.

For example, device 102 can be a UE, modem (or other tethered device), a portion thereof, and/or the like. Access points 104 and 112 can each be a macrocell, femtocell, picocell, or similar base station, a router (e.g., a 802.11b (WiFi) hotspot or similar router), relay node, device communicating in peer-to-peer or ad-hoc mode with device 102, a portion thereof, and/or the like. Networks 106 and 114 can each be a 3GPP, 3GPP LTE, UMTS, WiMAX, wireless local area network (WLAN), or similar networks offering access point entry thereto. In addition, for example, gateway 108 can be a packet data network (PDN) gateway. In this regard, for example, gateway 108 can be a home agent gateway for device 102, which networks 106 and 114 can access. State information server 110 can be a home subscription server (HSS) or similar server that comprises information regarding device 102 or one or more additional devices.

According to an example, device 102 can establish network connections to access points 104 and 112 to communicate in networks 106 and 114. Gateway 108 can also be associated with device 102 for each of the connections. One or more of the network connections can be detached, such as the connection through access point 104, in such a way to ensure state information server 110 retains relevant state information for device 102 in case device 102 reattaches the connection to network 106. In this example, it is to be appreciated that device 102 can maintain the connection to network 114 throughout detaching and reattaching the connection to access point 104. It is to be appreciated that the connection to network 106 can be detached by device 102 or network 106. For example, device 102 can initiate the detach based at least in part on at least one of degraded signal quality of access point 104, lack of available resources, a command from a power management function, etc. Further, for example, network 106 can initiate a detach based at least in part on at least one of an indication from access point 104, detecting a change of a subscription corresponding to device 102, etc.

In one example, when device 102 initiates the detach from network 106 through access point 104, device 102 can move network communications from access point 104 to access point 112. This can include, for example, handing over flows associated with network 106 to network 114. For example, a flow can refer to a connection between two or more nodes over which data packets can be communicated (e.g., using an internet protocol (IP) or other methods). In addition, device 102 can transmit an additional handover message, such as a binding update message, to the gateway 208 instead of subsequently detaching the connection to network 106. In this regard, one or more components of network 106 can remove some resources associated with device 102 that are no longer needed, e.g. connection-related resources, based on the binding update while retaining some state information of device 102 at state information server 110. As described further herein, the retained state information can include an identifier of gateway 108 and/or one or more gateways associated with device 102 in network 106. In another example, where network 106 initiates detach of the connection between access point 104 and device 102, network 106 (e.g., via one or more components thereof), can send state information to state information server 110 following detach of device 102 from access point 104. For example, detach of the connection to network 106 by device 102 can cause one or more components to delete relevant state information from state information server 110; thus, gateway 108, network 106, or another component can provision the state information back to state information server 110 after the deletion of the state information caused by the detach.

Figure 2:
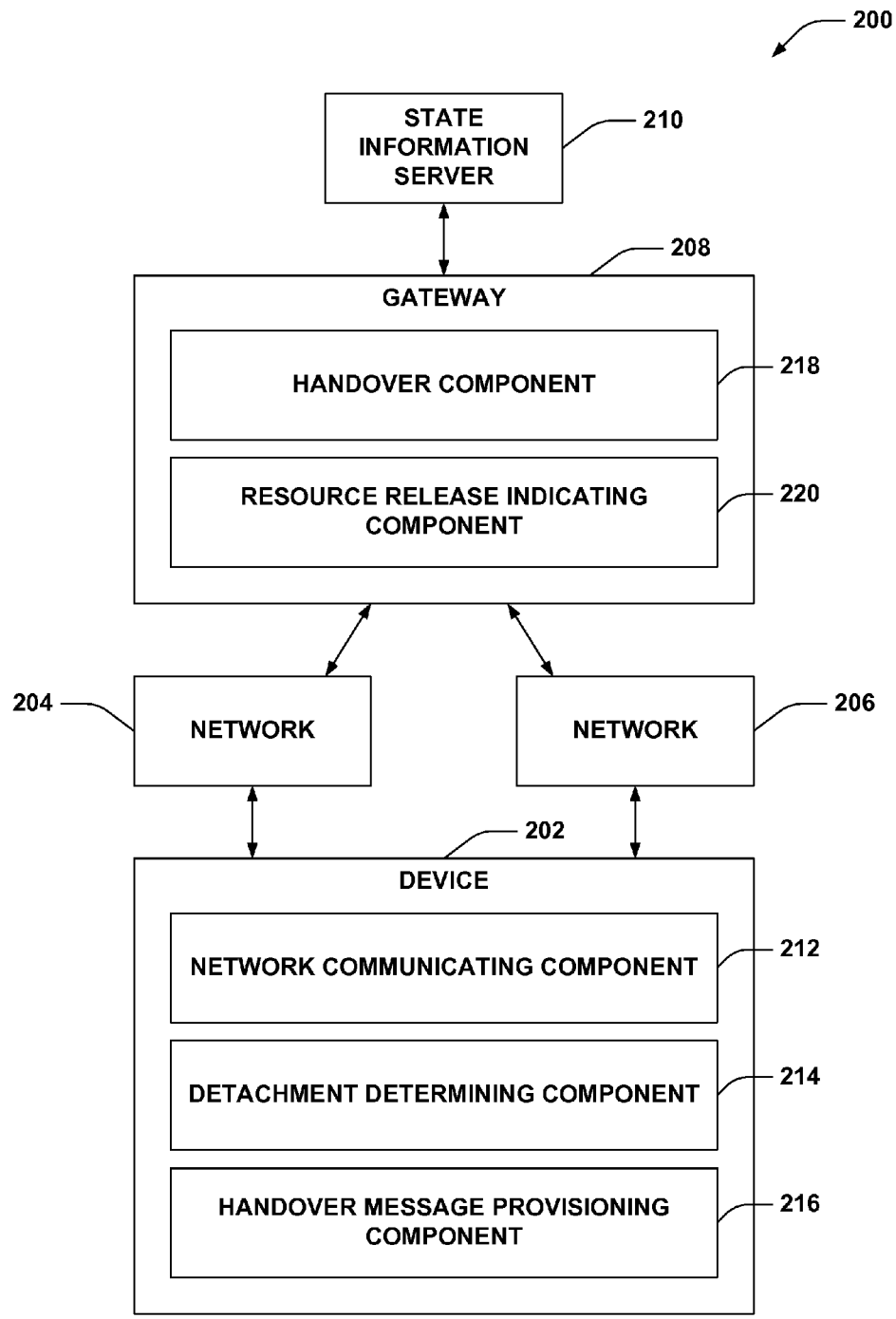
FIG. 2 illustrates an example system for detaching from one of a plurality of network connections.

Turning to FIG. 2, an example wireless communication system 200 is illustrated that facilitates managing connections with multiple access points. System 200 comprises a device 202 that can communicate with one or more networks, such as networks 204 and 206 (e.g., through one or more access points (not shown), as described above). In addition, networks 204 and 206 can communicate with a gateway 208, which can provide access to a state information server 210 and/or one or more other components of a home or visited network (e.g., policy charging and rules function (PCRF), etc.). As described, device 202 can be a UE, modem, etc., networks 204 and 206 can each be a 3GPP, WLAN, or similar network, gateway 208 can be a PDN gateway (and/or a home agent gateway), and/or the like, and state information server 210 can be a HSS, etc.

For example, device 202 can include a network communicating component 212 that can transmit signals to and/or receive signals from one or more networks (e.g., via one or more access points), a detachment determining component 214 for discerning to detach a connection from one or more of the networks, and a handover message provisioning component 216 that can transmit one or more handover messages to perform the detach. Gateway 208 can include a handover component 218 that detects handover of communications from one network connection of a device to another network connection of the device, and a resource release indicating component 220 that can specify to one or more components of network 204 or 206 to release resources related to the device based at least in part on the handover.

According to an example, network communicating component 212 can facilitate communicating with networks 204 and 206 (e.g., via one or more access points). In one example, communicating with networks 204 and 206, as opposed to one network, can provide connection diversity, increased data rates, additional services, and/or the like. For example, in this regard, network communicating component 212 can include or otherwise utilize a transmitter/receiver and/or related processors to receive signals from and transmit signals to networks 204 and/or 206. In an example, detachment determining component 214 can determine to detach connection from network 204. For example, detachment determining component 214 can determine to detach based at least in part on detecting loss of coverage from network 204, one or more device 202 related parameters, such as a power saving function (e.g., detach the connection to conserve power utilized to keep the connection active, etc.), switching off of a receiver related to network 204, etc., based at least in part on updated policies from an access network discovery and selection function (ANDSF), etc., as described above. In one example, network communicating component 212 can handover flows from network 204 to network 206 before detaching, and can notify the gateway 208 (e.g., by communicating a binding update to gateway 208). In this example, handover component 218 can accordingly update bindings to associate the flows with network 206.

In addition, instead of performing a detach of the network 204 connection, handover message provisioning component 216 can transmit another binding update message to gateway 208 that indicates handover of the network 204 connection to network 206. This can cause state information server 210 to preserve an identifier of gateway 208, as described above and further herein. In this example, handover component 218 can receive the binding update or other indication of handover from device 202 (e.g., through network 204 or 206). Resource release indicating component 220 can accordingly notify network 204, or one or more components thereof, to release resources related to device 202 based at least in part on the handover. In this regard, for example, by indicating handover as the reason for releasing resources related to device 202, network 204 or the one or more components thereof can release the resources without causing removal certain state information related to device 202 from state information server 210, as may occur in the case of indicating detach of the connection to the one or more components.

In one specific example, network 204 can be a 3GPP LTE network, and/or network 206 can be a WLAN. In this example, detachment determining component 214 can discern to detach the 3GPP LTE network 204 connection. Thus, network communicating component 212 can optionally handover IP flows from the 3GPP LTE network 204 to the WLAN network 206, and can transmit a binding update to gateway 208 to facilitate updating bindings. In addition, handover message provisioning component 216, for example, can transmit a dual stack mobile internet protocol (DSMIP) handover message (e.g., another binding message) indicating handover of the 3GPP LTE connection to the WLAN network 206 connection instead of indicating an explicit detach from the 3GPP LTE network 204 connection. For example, handover component 218 can receive the DSMIP handover message, release resources, routing addresses, etc., related to the 3GPP LTE connection, and resource release indicating component 220 can accordingly notify an MME of the 3GPP network 204 to release resources due to handover. The MME can accordingly not delete an identifier of the gateway from state information server 210, which can be an HSS in this example, as it would for an explicit detach of the 3GPP LTE connection.

Thus, the gateway 208 can continue to be associated with device 202 in the state information server 210 so where network communicating component 212 reattaches to network 204 (via the same or another access point), gateway 208 can be reassigned to the device 202 for the reattached connection based at least in part on the identifier stored at the state information server (e.g., HSS) 210. For example, network communicating component 212 can receive the gateway 208 assignment and can accordingly communicate one or more packets to the gateway 208 following reattaching the connection. This can prevent device 202 ending up with two gateways, as could happen where the gateway identifier is deleted from the state information server 210.

Figure 3:
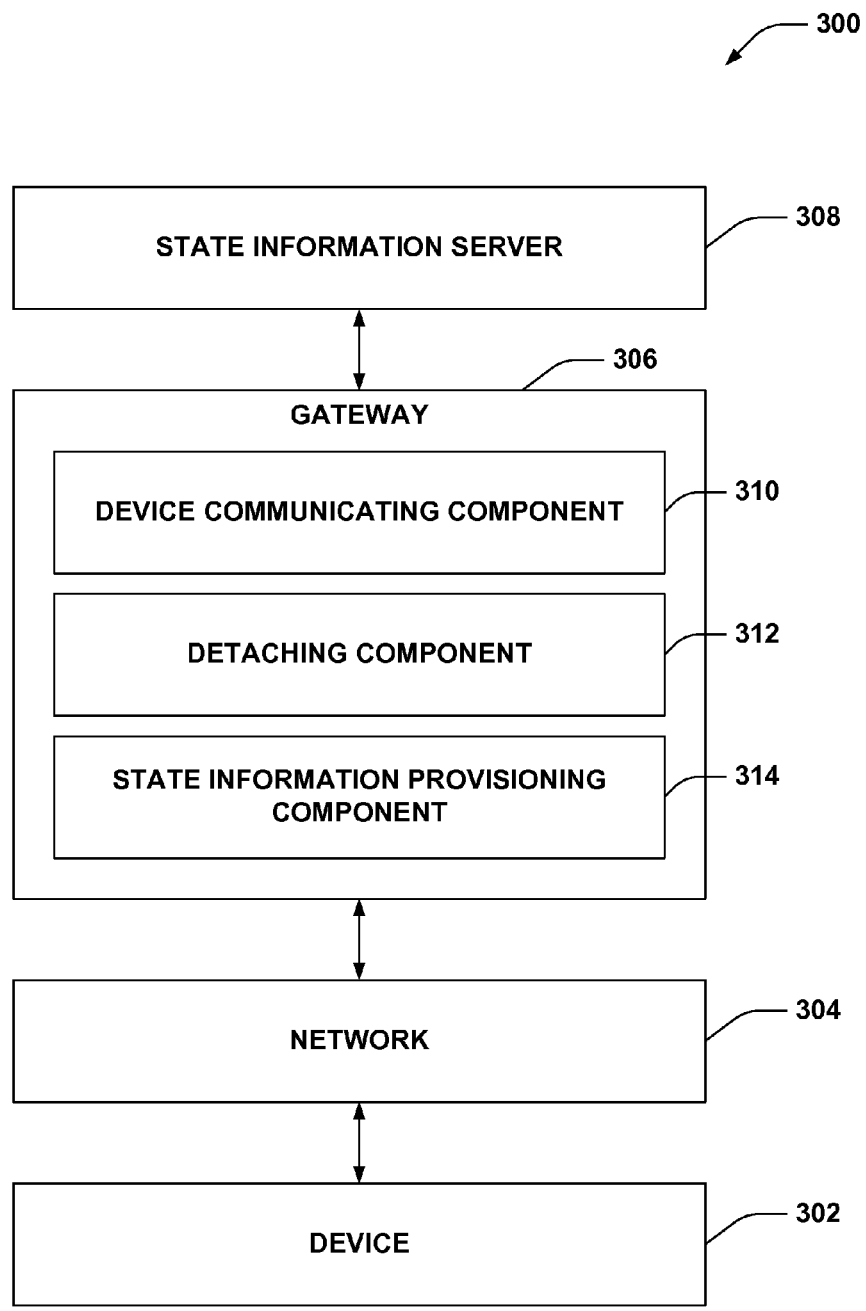
FIG. 3 illustrates an example system for performing a network initiated detach of one of a plurality of network connections related to a device.

Referring to FIG. 3, illustrated is an example wireless communication system 300 that facilitates ensuring state information for a device is retained when detaching a connection. System 300 comprises a device 302 that communicates with a network 304 (e.g., via one or more access points). Network 304, or one or more components thereof, can communicate with a gateway 306 to provide wireless network access to device 302 and/or one or more other devices. System 300 also comprises a state information server 308 that maintains state information for one or more devices, as described. For example, device 302, as described, can be a UE, modem, etc., network 304 can be a 3GPP LTE network, WLAN, and/or the like, and state information server 308 can be a HSS, etc. In addition, for example, gateway 306 can be a PDN gateway (and/or a home agent gateway for device 302, for example).

Gateway 306 can comprise a device communicating component 310 that can facilitate communicating with one or more devices through a network, access point, etc., a detaching component 312 that can facilitate detaching a connection between the device and the network, and a state information provisioning component 314 that can ensure one or more servers retain device state information despite detaching the connection. According to an example, device communicating component 310 can communicate with device 302 through network 304 (and/or one or more other network components not shown), and provide device 302 communications to/from one or more other network components, such as state information server 308 or other components (not shown) to provide one or more services to device 302. Detaching component 312 can determine to detach the connection between network 304 and device 302, and/or that the connection is being detached. As described, for example, device 302 can still communicate with gateway 306 through a different network. For example, detaching component 312 can determine to detach the network connection based at least in part on receiving a detachment request from network 304 or one or more components thereof, a routing tunnel termination from an MME, etc. Detaching component 312 can release resources, routing addresses, etc. related to device 302, for example. In another example, detaching component 312 can communicate an indication of detachment to network 304 or one or more components thereof to cause release of resources by network 304 as well.

Moreover, for example, state information server 308 can delete state information related to device 302 based at least in part on detaching the network connection (e.g., based at least in part on receiving a detach notification related to device 302 from one or more other network nodes, such as a mobility management entity (MME) or other component (not shown), etc.). In this example, state information provisioning component 314 can provide the state information related to device 302 to state information server 308 following deletion. In a specific example, the state information can relate to an identifier of gateway 306, and thus, state information server 308 can delete the identifier based at least in part on a command from a component of network 304 associated with device 302 as part of detaching from network 304. In this regard, for example, state information provisioning component 314 can provide the identifier of gateway 306 to state information server 308 following the detach. Thus, as described above, state information server 308 can retain the gateway identifier for device 302 to handle reattachment of a device 302 connection to network 304.

In one example, state information provisioning component 314 can initialize a timer before providing the state information to state information server 308 to avoid a race condition with an MME that causes deletion of the state information from state information server 308. In this example, the MME first completes the deletion process, and after expiration of the timer, state information provisioning component 314 can provide the state information back to state information server 308. In this regard, for example, state information provisioning component 314 initializes the timer using a value determined based at least in part on a timer utilized by the MME for deleting the state information from the state information server 308 (e.g., which can be provisioned to the gateway 306 from the state information server 308). Thus, where the state information is an identifier of the gateway 306 and device 302 reattaches to network 304 or another access point of the same network, gateway 306 can be assigned for device 302 communication based on the state information at state information server 308. For example, as described, device 302 can be communicating with gateway 306 through a disparate access point upon reattaching to network 304 or another access point of the same network.

Figure 4:
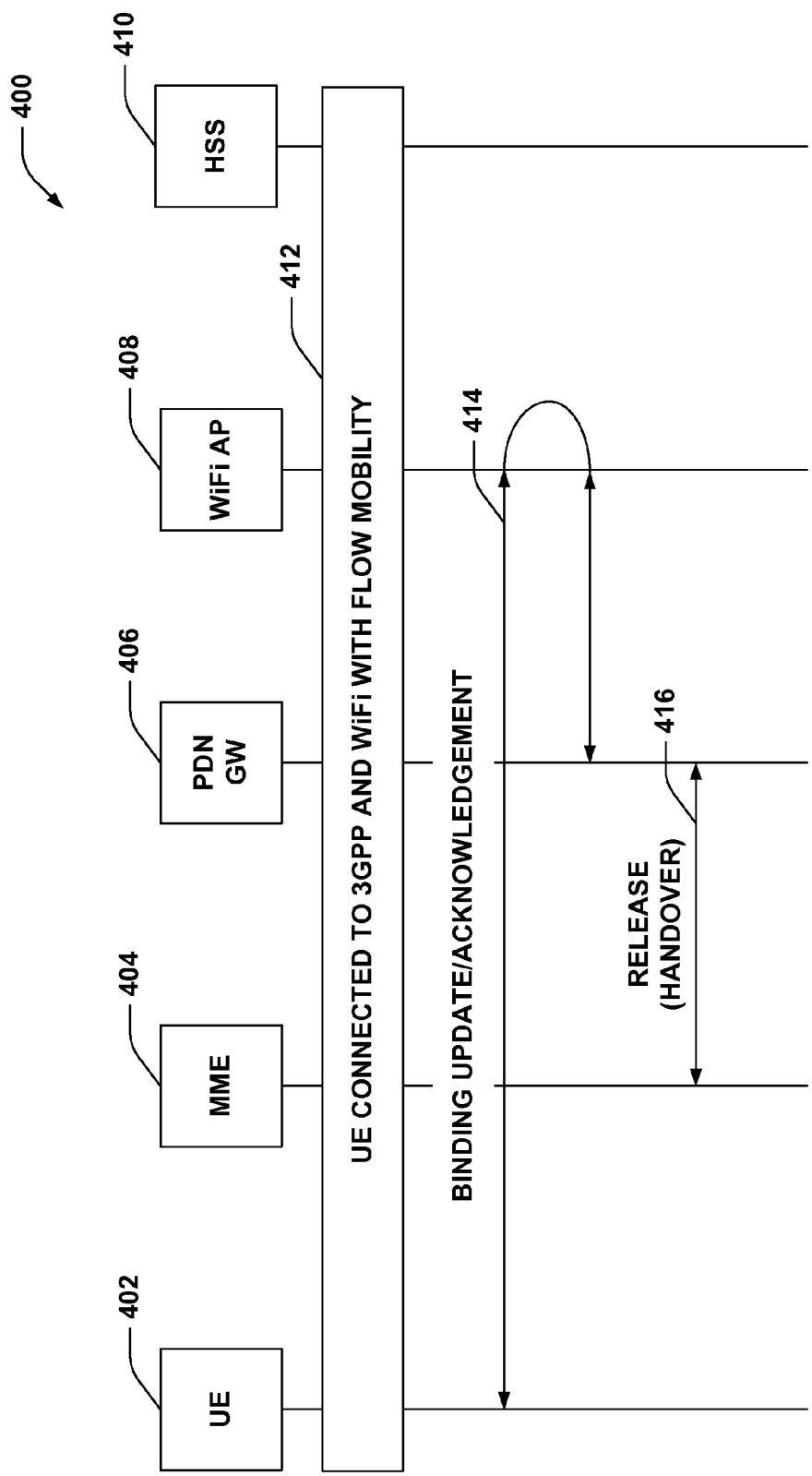
FIG. 4 illustrates an example system that facilitates specifying handover when indicating a release of resources to detach a network connection.

Turning to FIG. 4, an example wireless communication system 400 that facilitates retaining device state information for detaching a connection is illustrated. System 400 can include a UE 402 that can communicate with an MME 404 (e.g., through one or more access points and/or other network nodes) or one or more other 3GPP LTE network components that provide authentication/authorization for UE 402. MME 404 can communicate with a PDN gateway (GW) 406 to communicate information to and from a HSS 410. For example, PDN GW 406 can be a home agent GW of UE 402. In addition, UE 402 can communicate with a WiFi access point (AP) 408 to additionally communicate with PDN GW 406. UE 402 can be connected to 3GPP and WiFi with flow mobility 412 through MME 404 and WiFi AP 408. Flow mobility, for example, can relate to the ability to transfer flows of one connection (e.g., the 3GPP connection) to another connection (e.g., the WiFi connection).

In this example, HSS 410 can include an identifier of PDN GW 406 for associating to UE 402. UE 402 can determine to detach the network connection to the 3GPP network and MME 404, for example. In this example, UE 402 can move flows from the 3GPP connection to the WiFi connection using flow mobility at 412 and can accordingly communicate an associated message (e.g., a binding update to PDN GW 406. In addition, instead of performing a detach of the 3GPP connection, UE 402 transmits a binding update to, and receives a binding acknowledgment 414 from, PDN GW 406 (e.g., through MME 404 and/or WiFi AP 408). The binding update/acknowledgement 414, as described, can relate to performing a DSMIP handover of the 3GPP connection to the WiFi connection. Thus, PDN GW 406 can indicate a resource release 416 to MME 404 specifying a handover identifier so MME 404 does not delete state information, such as an identifier of PDN GW 406, from the HSS 410 for UE 402. In this regard, UE 402 can subsequently reattach the 3GPP connection and receive a PDN GW 406 assignment from HSS 410 based at least in part on HSS 410 retaining the identifier. For example, where UE 402 maintains a connection to WiFi AP 408 during detachment/reattachment of the 3GPP connection, assignment of PDN GW 406 can be important since UE 402 continues to communicate with PDN GW 406 through the WiFi AP 408.

Figure 5:
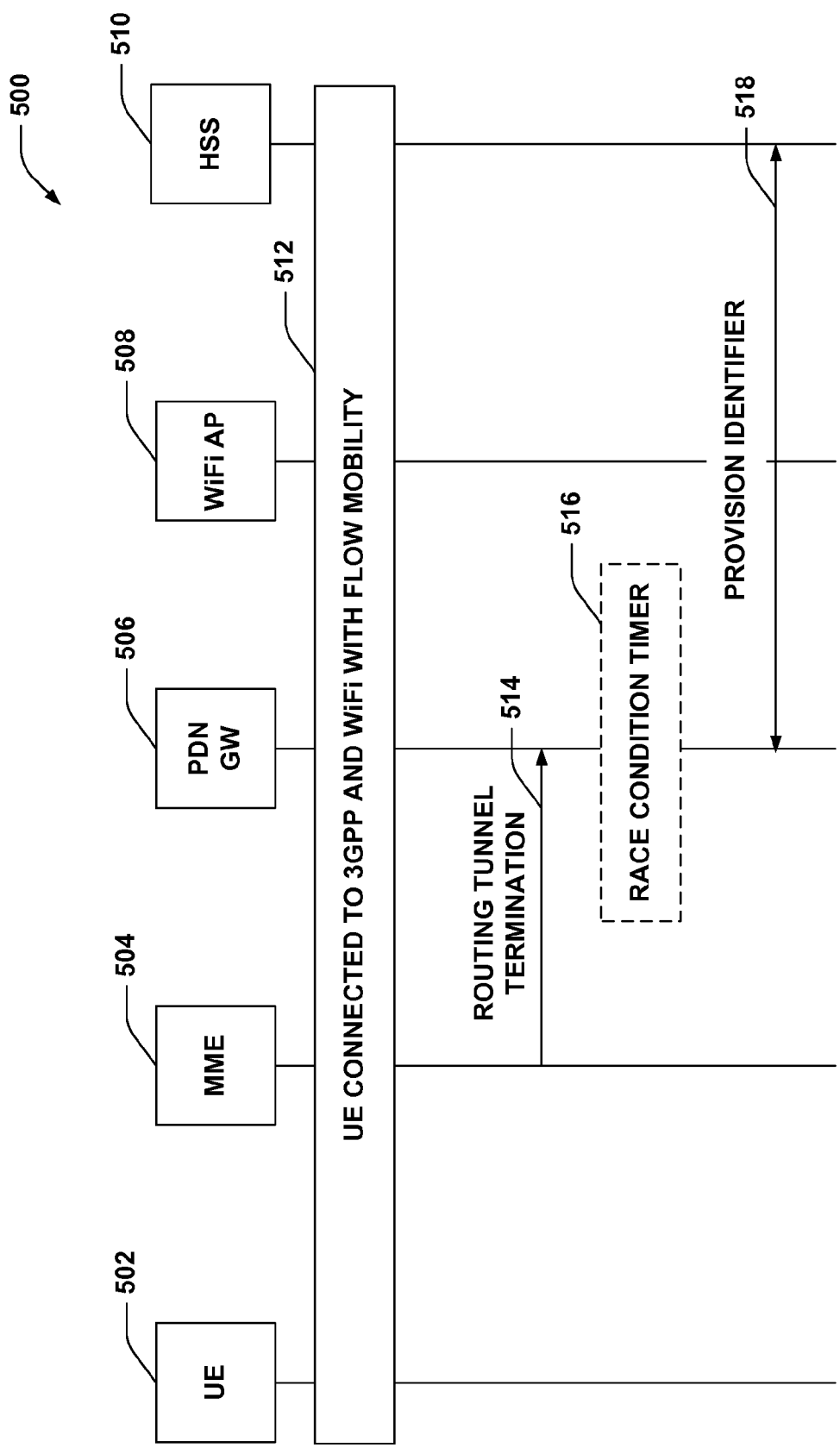
FIG. 5 illustrates an example system for provisioning state information to a home subscriber server (HSS) following detach of a network connection related to a device.

Referring to FIG. 5, an example wireless communication system 500 that facilitates retaining device state information for detaching a connection is illustrated. System 500 can include a UE 502 that can communicate with an MME 504 (e.g., through one or more access points and/or other network nodes) or one or more other 3GPP LTE network components that provide authentication/authorization for UE 502. MME 504 can communicate with a PDN GW 506 to communicate information to and from a HSS 510. In addition, UE 502 can communicate with a WiFi AP 508 to additionally communicate with PDN GW 506. UE 502 can be connected to 3GPP and WiFi with flow mobility 512 through MME 504 and WiFi AP 508. In this example, HSS 510 can include an identifier of PDN GW 506 for associating to UE 502.

MME 504 can begin to detach a 3GPP connection with UE 502, which can be based at least in part on determining the UE 502 is not accessible, subscription information for the UE 502 has changed, etc., as described. In this regard, MME 504 can transmit a routing tunnel termination 514 to PDN GW 506. This can relate to a general packet radio service (GPRS) tunneling protocol (GTP), and/or the like, which can be established for forwarding UE 502 communications to PDN GW 506 through MME 504 and/or other network components. Based at least in part on receiving the routing tunnel termination 514, PDN GW 506 can optionally initialize a race condition timer 516 to allow MME 504 to remove state information from HSS 510, as described. In either case, at 518, PDN GW can provision its identifier 518 to HSS 510. Thus, HSS 510 can assign the PDN GW 506 to UE 502 upon subsequently reattaching UE 502 to the 3GPP network.

Figure 6:
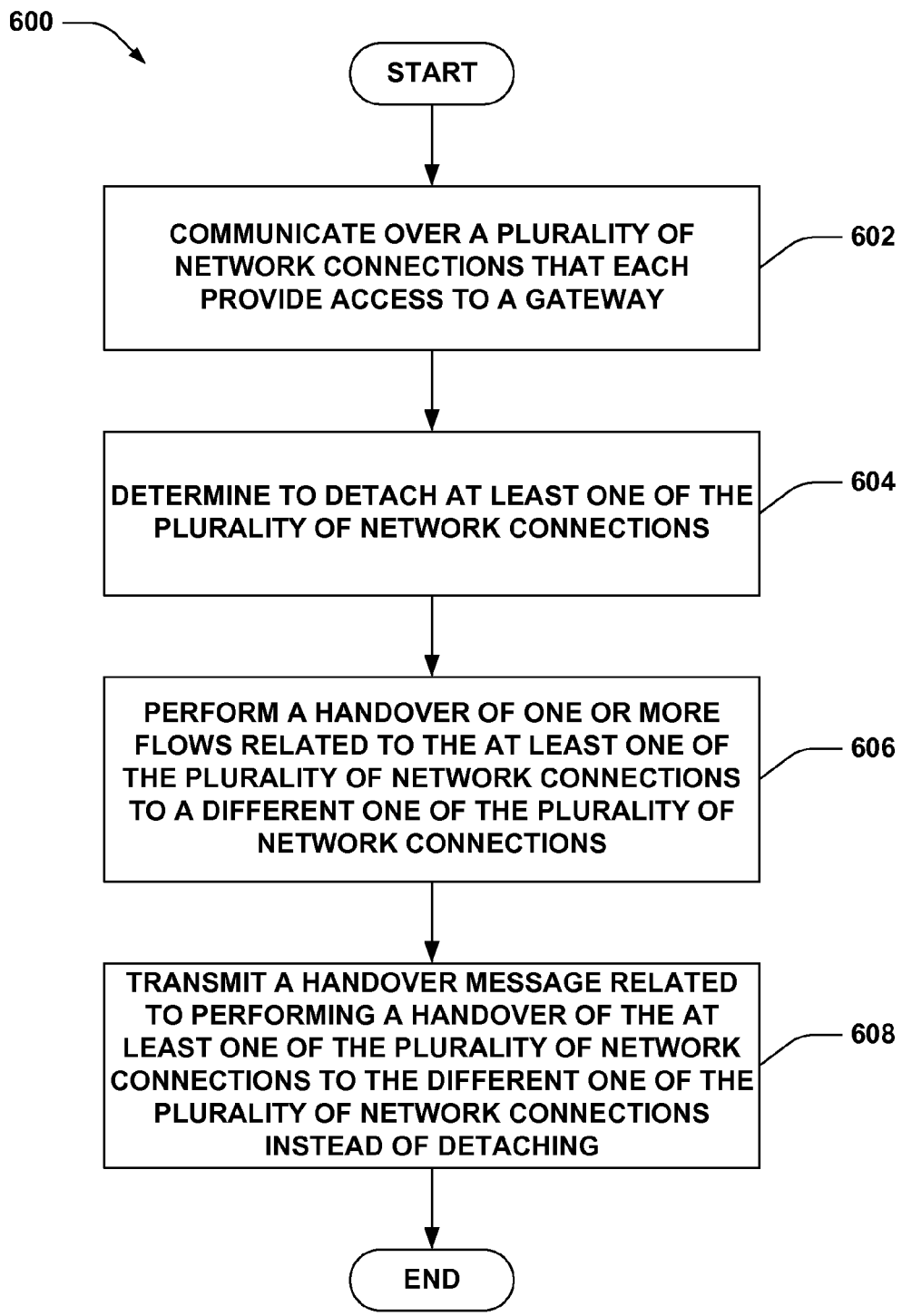
FIG. 6 illustrates an example methodology that transmits a handover message to detach one of a plurality of network connections.
Figure 7:
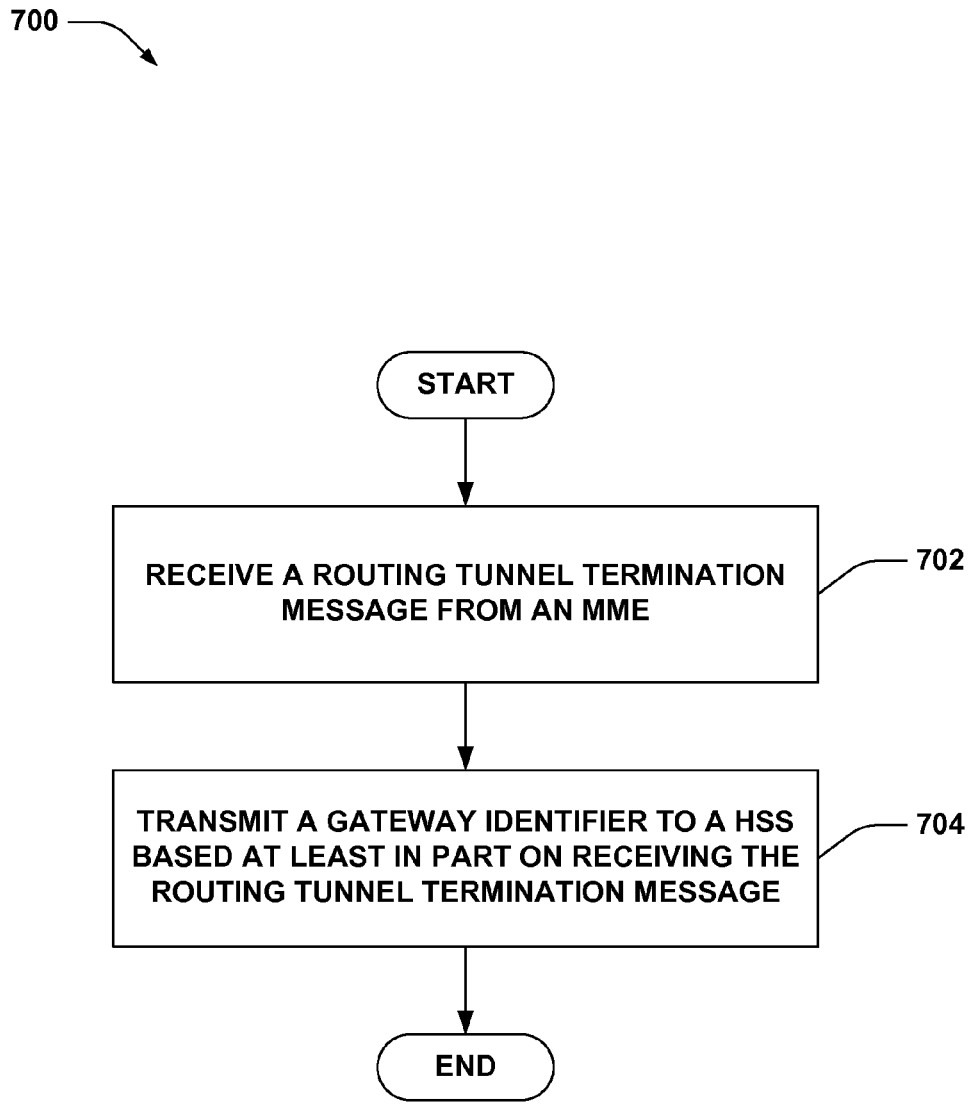
FIG. 7 illustrates an example methodology that provisions state information to a HSS as part of detaching a network connection related to a device.

Referring to FIGS. 6-7, example methodologies relating to ensuring state information is retained when detaching from one of a plurality of network connections are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 6, an example methodology 600 is displayed that facilitates detaching one of a plurality of network connections by handing over to another one of the plurality of network connections. At 602, a plurality of network connections each providing access to a gateway can be communicated over. As described, the plurality of network connections can include a 3GPP, WLAN, or similar network connections. In addition, the gateway can be a home agent gateway. At 604, it can be determined to detach at least one of the plurality of network connections. For example, detaching can be determined based at least in part on loss or degradation of signal quality with a related access point, decrease in available resources, a power management command, etc., as described.

At 606, a handover of one or more flows related to at least one of the plurality of network connections to a different one of the plurality of network connections can be performed. This can include, for example, transmitting a binding update to a gateway to facilitate updating bindings related to the flows. Moreover, at 608, a handover message related to performing a handover of the at least one of the plurality of network connections to the different one of the plurality of network connections can be transmitted instead of detaching. In this regard, for example, a state information server can retain information related to the one of the plurality of network connections that it would not retain if the connection was detached. In a specific example, as described above, the handover message can relate to performing a DSMIP handover from a 3GPP network to a WLAN network can cause a HSS to retain an identifier of a gateway utilized in the 3GPP network (e.g., and the WLAN network), which can be subsequently provisioned to the device from the HSS when reattaching the 3GPP connection.

Turning to FIG. 7, an example methodology 700 is displayed that facilitates provisioning a gateway identifier to a HSS following device detach. At 702, a routing tunnel termination message can be received from an MME. This message can be a GTP termination message indicating detach of a 3GPP connection related to a device, for example. At 704, a gateway identifier can be transmitted to a HSS based at least in part of receiving the routing tunnel termination message. As described, for example, the gateway identifier can have been deleted by an MME following detach of the device, and thus, the gateway identifier is transmitted again to the HSS. This can be based at least in part on a timer, for example, as described above.

It will be appreciated that, in accordance with one or more aspects described herein, inferences can be made regarding determining a timer value for transmitting a gateway identifier to an HSS, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
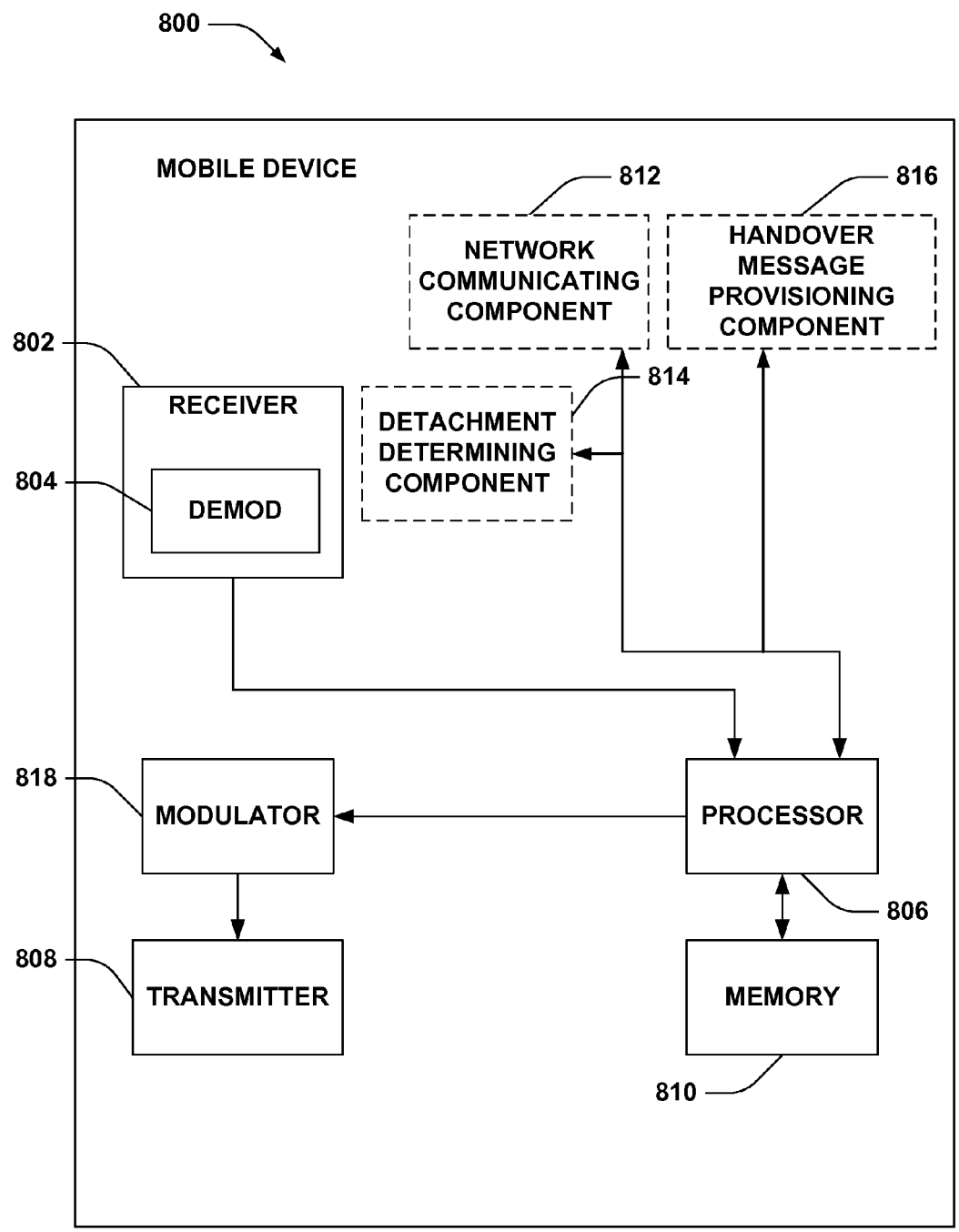
FIG. 8 illustrates an example mobile device for detaching a network connection at least in part by handing over to another connection.

FIG. 8 is an illustration of a mobile device 800 that facilitates handing over communications in detaching one of a plurality of network connections. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800.

Mobile device 800 can additionally comprise memory 810 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 810 can additionally store protocols and/or algorithms associated with estimating and/or utilizing a channel (e.g., performance based, capacity based, etc.).

It will be appreciated that the data store (e.g., memory 810) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory.

Processor 806 can further be optionally operatively coupled to a network communicating component 812, which can be similar to network communicating component 212, a detachment determining component 814, which can be similar to detachment determining component 214, and/or a handover message provisioning component 816, which can be similar to handover message provisioning component 216. Mobile device 800 still further comprises a modulator 818 that modulate signals for transmission by transmitter 808 to, for instance, a base station, another mobile device, etc. Although depicted as being separate from the processor 806, it is to be appreciated that the network communicating component 812, detachment determining component 814, handover message provisioning component 816, demodulator 804, and/or modulator 818 can be part of the processor 806 or multiple processors (not shown).

Figure 9:
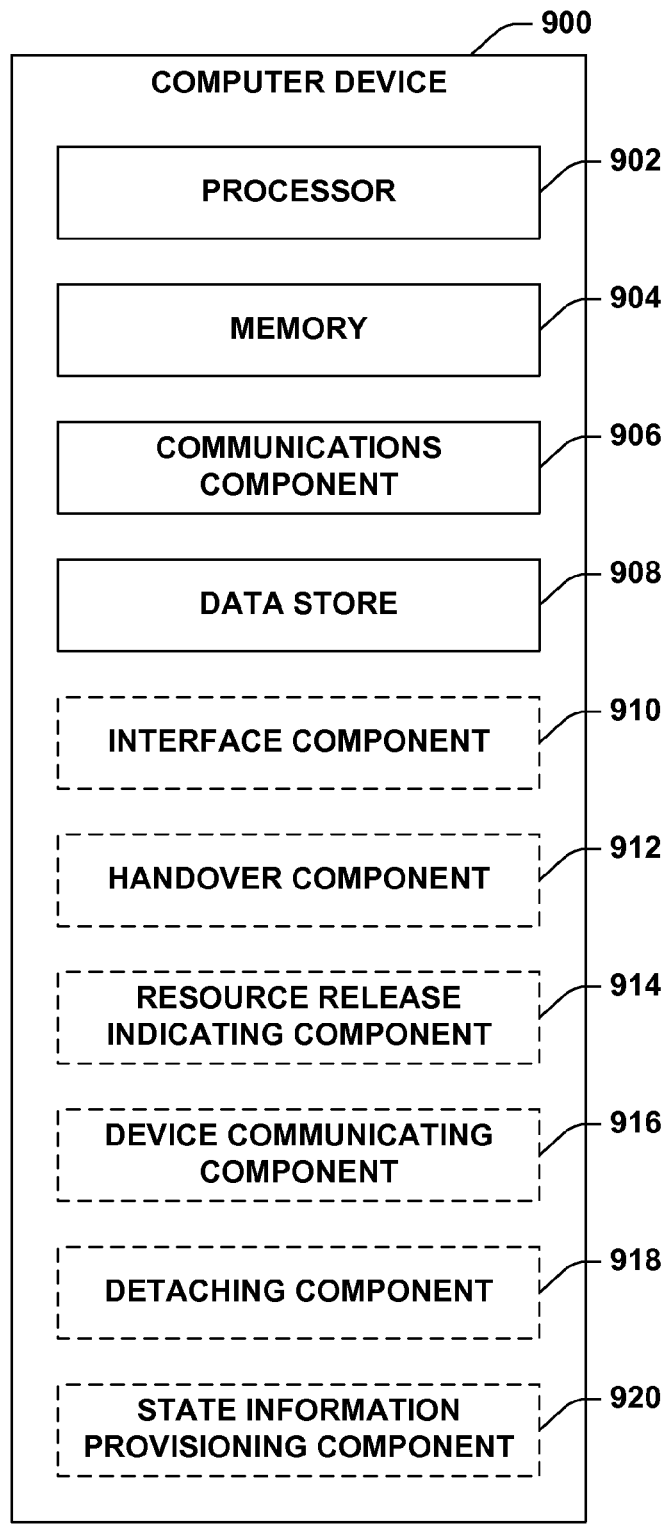
FIG. 9 illustrates an example computer device for handling detach of a network connection related to a device.

Referring to FIG. 9, a computer device 900 is displayed in accordance with aspects described herein. In an example, computer device can be a gateway or similar network node. Computer device 900 includes a processor 902 for carrying out processing functions associated with one or more of components and functions described herein. Processor 902 can include a single or multiple set of processors or multi-core processors. Moreover, processor 902 can be implemented as an integrated processing system and/or a distributed processing system.

Computer device 900 further includes a memory 904, such as for storing local versions of applications being executed by processor 902. Memory 904 can include substantially any type of memory usable by a computer, such as random access memory (RAM), read only memory (ROM), tapes, magnetic discs, optical discs, volatile memory, non-volatile memory, and any combination thereof.

Further, computer device 900 includes a communications component 906 that provides for establishing and maintaining communications with one or more parties utilizing hardware, software, and services as described herein. Communications component 906 may carry communications between components on computer device 900, as well as between computer device 900 and external devices, such as devices located across a communications network and/or devices serially or locally connected to computer device 900. For example, communications component 906 may include one or more buses, and may further include transmit chain components and receive chain components associated with a transmitter and receiver, respectively, operable for interfacing with external devices.

Additionally, computer device 900 may further include a data store 908, which can be any suitable combination of hardware and/or software, that provides for mass storage of information, databases, and programs employed in connection with aspects described herein. For example, data store 908 may be a data repository for applications not currently being executed by processor 902.

Computer device 900 may optionally include an interface component 910 that can be operable to receive inputs from a user of computer device 900, and further operable to generate outputs for presentation to the user. Interface component 910 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 910 may include one or more output devices, including but not limited to a display, a speaker, a haptic feedback mechanism, a printer, any other mechanism capable of presenting an output to a user, or any combination thereof. In another example, interface component 910 can be an application programming interface (API) that can be accessed by one or more devices to perform functions on computer device 900.

In addition, in the depicted example, computer device 900 can optionally include one or more of a handover component 912, resource release indicating component 914, device communicating component 916, detaching component 918, or state information provisioning component 920. Thus, these components 912, 914, 916, 918, and/or 920, which can be similar to other components described herein, can utilize processor 902 to execute instructions associated therewith, memory 904 to store information associated therewith, communications component 906 to carry out communications, and/or the like, as described. In addition, it is to be appreciated that computer device 900 can include additional or alternative components described herein.

Figure 10:
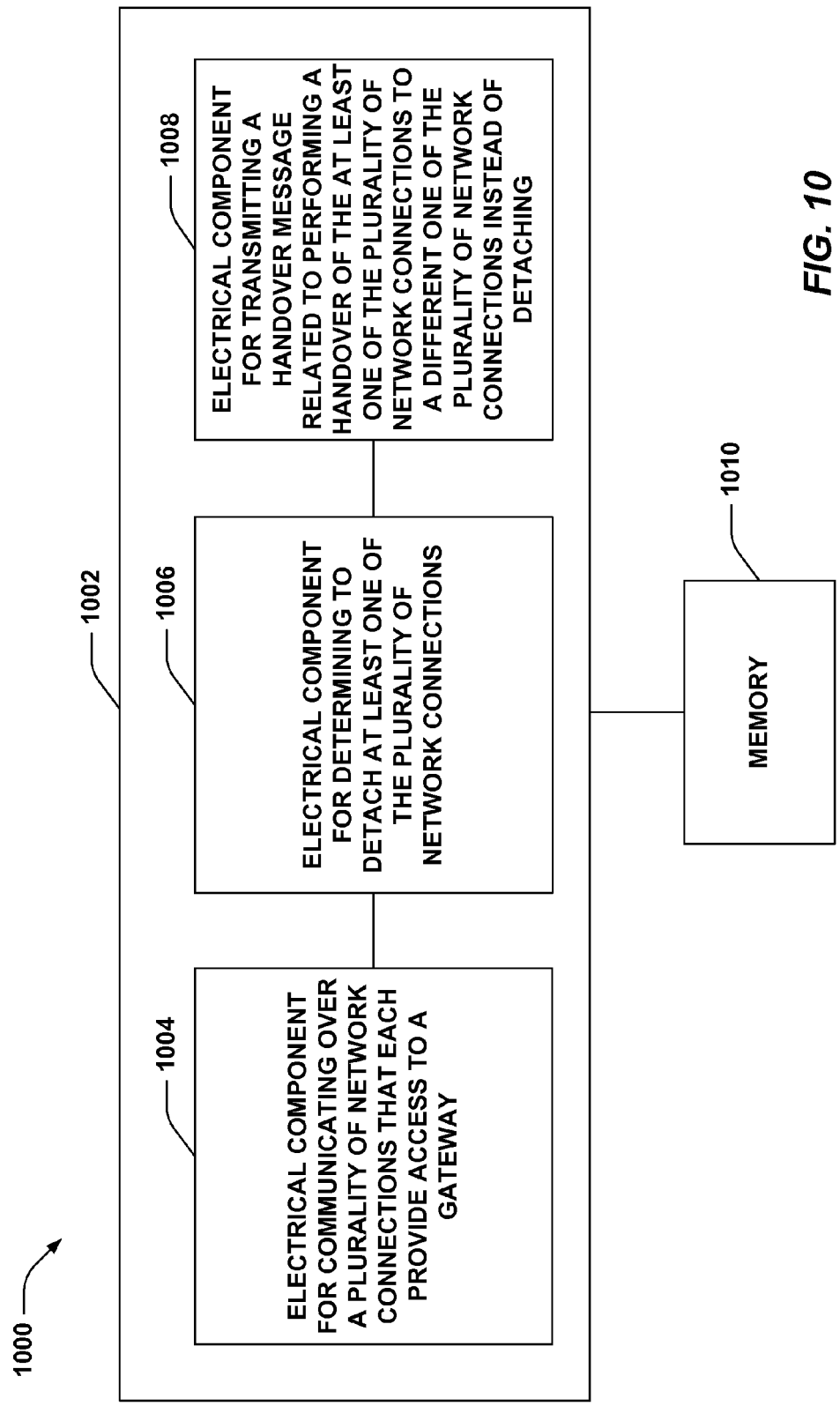
FIG. 10 illustrates an example system for transmitting a handover message to detach one of a plurality of network connections.

With reference to FIG. 10, illustrated is a system 1000 that detaches a network connection by performing handover of the network connection to another network connection. For example, system 1000 can reside at least partially within an device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for communicating over a plurality of network connections that each provide access to a gateway 1004. For example, the plurality of network connections can include a 3GPP connection, WLAN connection, etc. Further, logical grouping 1002 can comprise an electrical component for determining to detach at least one of the plurality of network connections 1006.

As described, for example, electrical component 1006 can determine to perform the detach based on one of various indicators, such as signal quality degradation below a threshold level, lack of resources, an indication from a power management function, and/or the like. In addition, as described, electrical component 1004 can additionally handover flows of the at least one of the plurality of network connections to the different one of the plurality of network connections. In this regard, logical grouping 1002 can include an electrical component for transmitting a handover message related to performing a handover of the at least one of the plurality of network connections to a different one of the plurality of network connections instead of detaching 1008. Thus, as described, state information regarding system 1000 can be retained at a state information server, as opposed to where system 1000 explicitly detaches from the one of the plurality of networks.

For example, electrical component 1004 can include a network communicating component 212. In addition, for example, electrical component 1006, in an aspect, can include a detachment determining component 214, as described above. Furthermore, electrical component 1008, in an aspect, can include a handover message provisioning component 216, as described. Additionally, system 1000 can include a memory 1010 that retains instructions for executing functions associated with the electrical components 1004, 1006, and 1008. While shown as being external to memory 1010, it is to be understood that one or more of the electrical components 1004, 1006, and 1008 can exist within memory 1010.

In one example, electrical components 1004, 1006, and 1008 can comprise at least one processor, or each electrical component 1004, 1006, and 1008 can be a corresponding module of at least one processor. Moreover, in an additional or alternative example, electrical components 1004, 1006, and 1008 can be a computer program product comprising a computer readable medium, where each electrical component 1004, 1006, and 1008 can be corresponding code.

Figure 11:
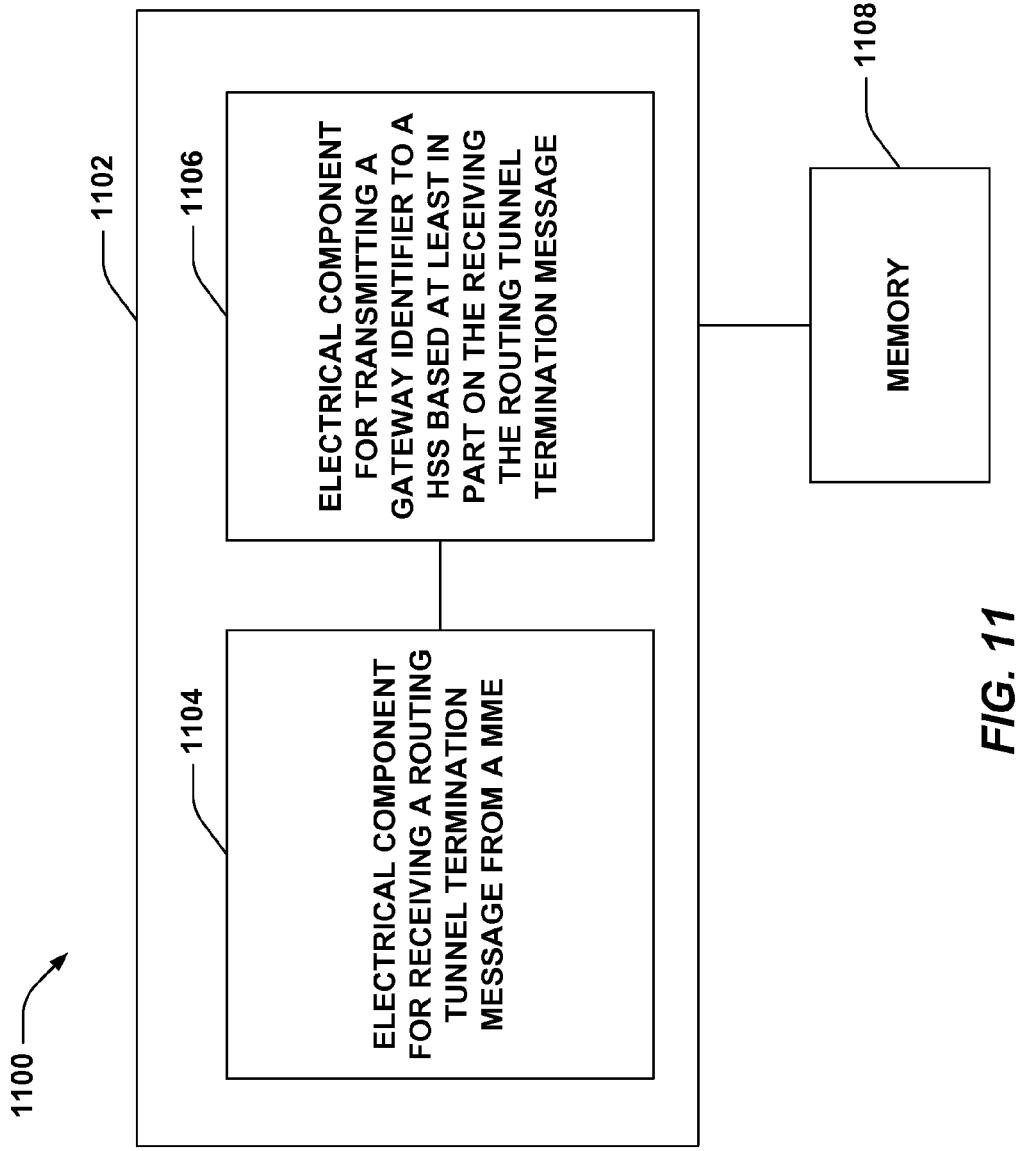
FIG. 11 illustrates an example system for provisioning state information to a HSS as part of detaching a network connection related to a device.

With reference to FIG. 11, illustrated is a system 1100 that provisions a gateway identifier to a state information server. For example, system 1100 can reside at least partially within a gateway, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a routing tunnel termination message from a MME 1104. As described, the routing tunnel termination message can be a GTP tunnel termination or similar message that indicates detachment of a device from a 3GPP connection.

Further, logical grouping 1102 can comprise an electrical component for transmitting a gateway identifier to a HSS based at least in part on the receiving the routing tunnel termination message 1106. As described, for example, the gateway identifier can be deleted by the MME once the device detaches from the 3GPP connection; thus, electrical component 1006 re-provisions the gateway identifier to the HSS for subsequent assignment to the device where the device reattaches the 3GPP connection. For example, in an aspect, electrical component 1104 can include detaching component 312, as described above. In addition, for example, electrical component 1106, in an aspect, can include state information provisioning component 314. Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108.

In one example, electrical components 1104 and 1106 can comprise at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
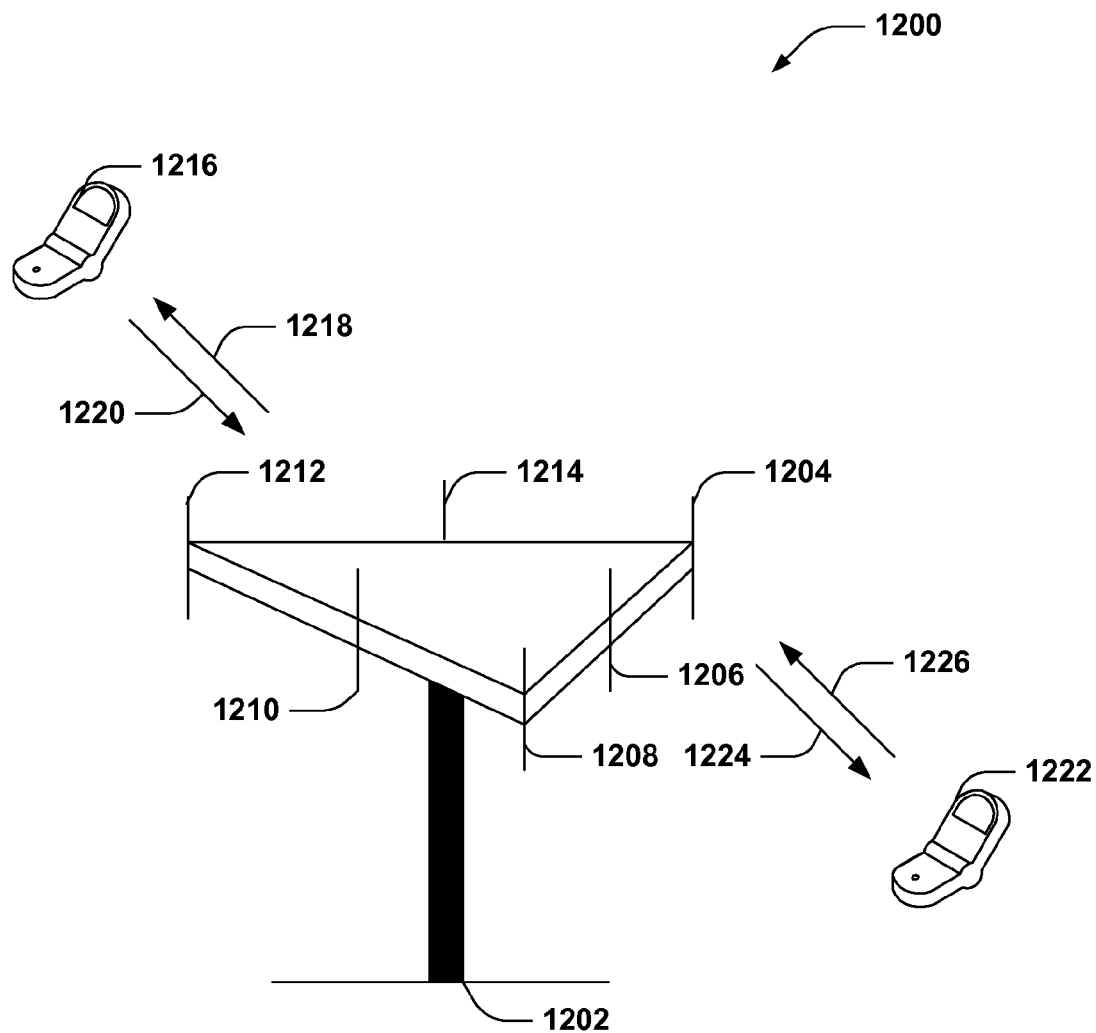
FIG. 12 illustrates an example wireless communication system in accordance with various aspects set forth herein.

Referring now to FIG. 12, a wireless communication system 1200 is illustrated in accordance with various embodiments presented herein. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1202 can communicate with one or more mobile devices such as mobile device 1216 and mobile device 1222; however, it is to be appreciated that base station 1202 can communicate with substantially any number of mobile devices similar to mobile devices 1216 and 1222. Mobile devices 1216 and 1222 can be, for example, cellular phones, smart phones, laptops, handheld communication devices, handheld computing devices, satellite radios, global positioning systems, PDAs, and/or any other suitable device for communicating over wireless communication system 1200. As depicted, mobile device 1216 is in communication with antennas 1212 and 1214, where antennas 1212 and 1214 transmit information to mobile device 1216 over a forward link 1218 and receive information from mobile device 1216 over a reverse link 1220. Moreover, mobile device 1222 is in communication with antennas 1204 and 1206, where antennas 1204 and 1206 transmit information to mobile device 1222 over a forward link 1224 and receive information from mobile device 1222 over a reverse link 1226. In a frequency division duplex (FDD) system, forward link 1218 can utilize a different frequency band than that used by reverse link 1220, and forward link 1224 can employ a different frequency band than that employed by reverse link 1226, for example. Further, in a time division duplex (TDD) system, forward link 1218 and reverse link 1220 can utilize a common frequency band and forward link 1224 and reverse link 1226 can utilize a common frequency band.

Each group of antennas and/or the area in which they are designated to communicate can be referred to as a sector of base station 1202. For example, antenna groups can be designed to communicate to mobile devices in a sector of the areas covered by base station 1202. In communication over forward links 1218 and 1224, the transmitting antennas of base station 1202 can utilize beamforming to improve signal-to-noise ratio of forward links 1218 and 1224 for mobile devices 1216 and 1222. Also, while base station 1202 utilizes beamforming to transmit to mobile devices 1216 and 1222 scattered randomly through an associated coverage, mobile devices in neighboring cells can be subject to less interference as compared to a base station transmitting through a single antenna to all its mobile devices. Moreover, mobile devices 1216 and 1222 can communicate directly with one another using a peer-to-peer or ad hoc technology as depicted. According to an example, system 1200 can be a multiple-input multiple-output (MIMO) communication system.

Figure 13:
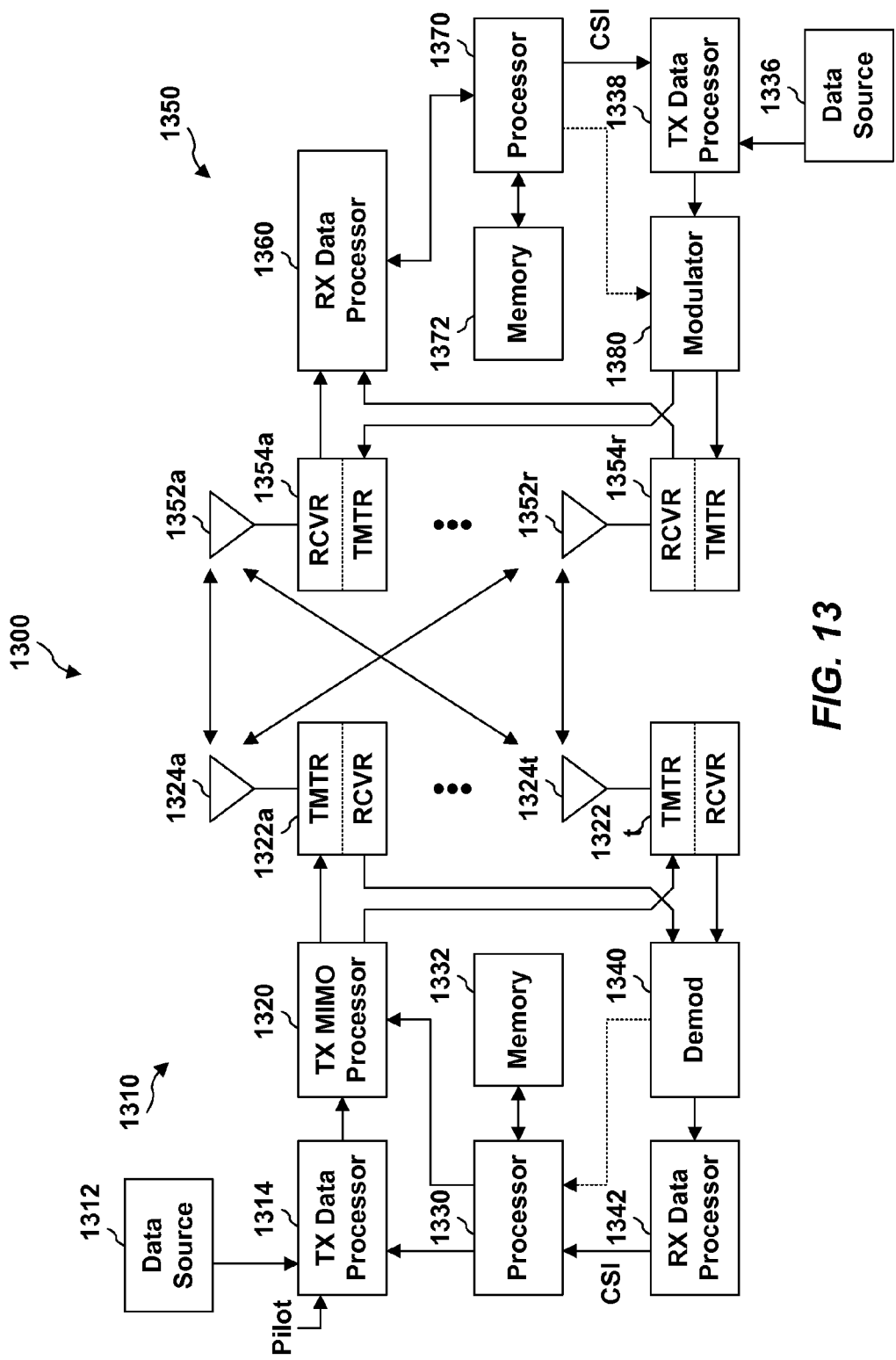
FIG. 13 illustrates an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-5 and 10-12), mobile devices (FIG. 8), computer devices, (FIG. 9), and/or methods (FIGS. 6-7) described herein to facilitate wireless communication there between. For example, components or functions of the systems and/or methods described herein can be part of a memory 1332 and/or 1372 or processors 1330 and/or 1370 described below, and/or can be executed by processors 1330 and/or 1370 to perform the disclosed functions.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides NT modulation symbol streams to NT transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1322a through 1322t are transmitted from NT antennas 1324a through 1324t, respectively.

At mobile device 1350, the transmitted modulated signals are received by NR antennas 1352a through 1352r and the received signal from each antenna 1352 is provided to a respective receiver (RCVR) 1354a through 1354r. Each receiver 1354 conditions (e.g., filters, amplifies, and down-converts) a respective signal, digitizes the conditioned signal to provide samples, and further processes the samples to provide a corresponding "received" symbol stream.

An RX data processor 1360 can receive and process the NR received symbol streams from NR receivers 1354 based on a particular receiver processing technique to provide NT "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for detaching one of multiple connections to one or more wireless networks, comprising:
    communicating over a plurality of network connections that each provide access to a gateway;
    determining to detach at least one of the plurality of network connections;
    performing a handover of one or more flows related to the at least one of the plurality of network connections to a different one of the plurality of network connections; and
    transmitting a handover message related to performing a handover of the at least one of the plurality of network connections to the different one of the plurality of network connections instead of detaching,
    wherein detaching results in removal of state information at a network device and handover results in maintenance of the state information at the network device; and
    subsequently reattaching the at least one of the plurality of network connections, and receiving an assignment to the gateway from a state information server based at least in part on an identifier retained based at least in part on transmitting the handover message instead of detaching.

2. The method of claim 1, wherein the transmitting the handover message includes transmitting a dual stack mobile internet protocol handover message, the at least one of the plurality of network connections is a third generation partnership project network, and the different one of the plurality of network connections is a wireless local area network.

3. An apparatus for detaching one of multiple connections to one or more wireless networks, comprising:
    at least one processor configured to:
    communicate over a plurality of network connections that each provide access to a gateway;
    determine to detach at least one of the plurality of network connections;
    perform a handover of one or more flows related to the at least one of the plurality of network connections to a different one of the plurality of network connections; and
    transmit a handover message related to performing a handover of the at least one of the plurality of network connections to the different one of the plurality of network connections instead of detaching;
    wherein detaching results in removal of state information at a network device and handover results in maintenance of the state information at the network device; and
    a memory coupled to the at least one processor;
    wherein the at least one processor is further configured to subsequently reattach the at least one of the plurality of network connections, and receive an assignment to the gateway from a state information server based at least in part on an identifier retained based at least in part on transmitting the handover message instead of detaching.

4. The apparatus of claim 3, wherein the handover message includes a dual stack mobile internet protocol handover message, the at least one of the plurality of network connections is a third generation partnership project network, and the different one of the plurality of network connections is a wireless local area network.

5. An apparatus for detaching one of multiple connections to a wireless network, comprising:
    means for communicating over a plurality of network connections that each provide access to a gateway;
    means for determining to detach at least one of the plurality of network connections; and
    means for transmitting a handover message related to performing a handover of the at least one of the plurality of network connections to a different one of the plurality of network connections instead of detaching,
    wherein the means for communicating performs a handover of one or more flows related to the at least one of the plurality of network connections to the different one of the plurality of network connections,
    wherein detaching results in removal of state information at a network device and handover results in maintenance of the state information at the network device,
    wherein the means for communicating subsequently reattaches the at least one of the plurality of network connections, and
    receives an assignment to the gateway from a state information server based at least in part on an identifier retained based at least in part on transmitting the handover message instead of detaching.

6. The apparatus of claim 5, wherein the handover message is a dual stack mobile internet protocol handover message, the one of the plurality of network connections is a third generation partnership project network, and the different one of the plurality of network connections is a wireless local area network.

7. A computer program product for detaching one of multiple connections to one or more wireless networks, comprising:
    a non-transitory computer-readable medium, comprising:
    code for causing at least one computer to communicate over a plurality of network connections that each provide access to a gateway;
    code for causing the at least one computer to determine to detach at least one of the plurality of network connections;

code for causing the at least one computer to perform a handover of one or more flows related to the at least one of the plurality of network connections to a different one of the plurality of network connections; and code for causing the at least one computer to transmit a handover message related to performing a handover of the at least one of the plurality of network connections to the different one of the plurality of network connections instead of detaching, wherein detaching results in removal of state information at a network device and handover results in maintenance of the state information at the network device;

wherein the computer-readable medium further comprises code for causing the at least one computer to subsequently reattach the at least one of the plurality of network connections, and receive an assignment to the gateway from a state information server based at least in part on an identifier retained based at least in part on transmitting the handover message instead of detaching.

8. The computer program product of claim 7, wherein the handover message includes a dual stack mobile internet protocol handover message, the one of the plurality of network connections is a third generation partnership project network, and the different one of the plurality of network connections is a wireless local area network.

9. An apparatus for detaching one of multiple connections to a wireless network, comprising:

a network communicating component for communicating over a plurality of network connections that each provide access to a gateway;

a detachment determining component for determining to detach at least one of the plurality of network connections; and a handover message provisioning component for transmitting a handover message related to performing a handover of the at least one of the plurality of network connections to a different one of the plurality of network connections instead of detaching, wherein the network communicating component performs a handover of one or more flows related to the at least one of the plurality of network connections to the different one of the plurality of network connections, wherein detaching results in removal of state information at a network device and handover results in maintenance of the state information at the network device;

wherein the network communicating component subsequently reattaches the at least one of the plurality of network connections, and receives an assignment to the gateway from a state information server based at least in part on an identifier retained based at least in part on the handover message provisioning component transmitting the handover message instead of detaching.

10. The apparatus of claim 9, wherein the handover message includes a dual stack mobile internet protocol handover message, the one of the plurality of network connections is a third generation partnership project network, and the different one of the plurality of network connections is a wireless local area network.

* * * * *